(12) United States Patent
Novicki et al.

(10) Patent No.: US 8,034,149 B2
(45) Date of Patent: Oct. 11, 2011

(54) PROCESS FOR OBTAINING A FERTILIZER WITH SUSTAINED RELEASE OF PHOSPHORUS

(75) Inventors: Luiz Alberto Medeiros Novicki, São Mateus do Sul (BR); Valmor Neves Vieira, São Mateus do Sul (BR); Waldemar Jiro Torii, Curitiba (BR); Clenio Nailto Pillon, Centro Pelotas (BR); Walkyria Bueno Scivittaro, Centro Pelotas (BR)

(73) Assignees: Petroleo Brasileiro S.A.-Petrobras, Rio De Janeiro (BR); Empresa Brasileira de Pesquisa Agropecuaria-Embrapa, Brasilia DF (BR)

( * ) Notice: Subject to any disclaimer, the term of this patent is extended or adjusted under 35 U.S.C. 154(b) by 412 days.

(21) Appl. No.: 12/158,740

(22) PCT Filed: Dec. 27, 2006

(86) PCT No.: PCT/BR2006/000306
§ 371 (c)(1), (2), (4) Date: Oct. 27, 2008

(87) PCT Pub. No.: WO2007/073587
PCT Pub. Date: Jul. 5, 2007

(65) Prior Publication Data
US 2009/0165516 A1    Jul. 2, 2009

(30) Foreign Application Priority Data
Dec. 29, 2005 (BR) ..................................... 0505770

(51) Int. Cl.
*C05B 17/00* (2006.01)
*C05B 17/02* (2006.01)

(52) U.S. Cl. ....................................... 71/32; 423/157.2

(58) Field of Classification Search ................ 71/31–63; 423/157.2
See application file for complete search history.

(56) References Cited

U.S. PATENT DOCUMENTS

| 1,397,264 | A | * | 11/1921 | Christenson et al. | ......... 423/471 |
| 2,911,295 | A |   | 11/1959 | Peter |  |
| 3,050,385 | A | * | 8/1962 | Parker | .......................... 71/64.11 |
| 3,760,048 | A | * | 9/1973 | Sullivan et al. | ............... 501/129 |
| 3,773,473 | A | * | 11/1973 | Howard et al. | ............. 23/293 R |
| 4,106,922 | A |   | 8/1978 | Hauschild et al. |  |
| 4,130,474 | A | * | 12/1978 | Anthony | ....................... 208/435 |
| 4,451,277 | A | * | 5/1984 | Barber | .............................. 71/36 |

FOREIGN PATENT DOCUMENTS

| AT | 123841 | B |   | 7/1931 |
| DE | 1138675 | C |   | 5/1963 |
| GB | 559238 |   | * | 2/1944 |

* cited by examiner

*Primary Examiner* — Wayne Langel
(74) *Attorney, Agent, or Firm* — Sughrue Mion, PLLC

(57) ABSTRACT

The present invention relates to obtaining a fertilizer with sustained release of phosphorus, enriched with other macro and micronutrients, which can be produced by pyrolysis of pyrobituminous shale, in combination with calcareous shale and with natural phosphatidic rocks. The invention presents a process for obtaining a solid fertilizer with sustained release of phosphorus, enriched with Ca, Mg, S, Si and micronutrients, by a combination of pyrolysis of a pyrobituminous shale at a temperature of 450-500° C., with the addition of calcareous shale and of a phosphatidic rock, which represents a promising innovation compared to the prior art, and will certainly serve to fill a gap in the availability of fertilizers permitted for use in agroecological systems.

6 Claims, 1 Drawing Sheet

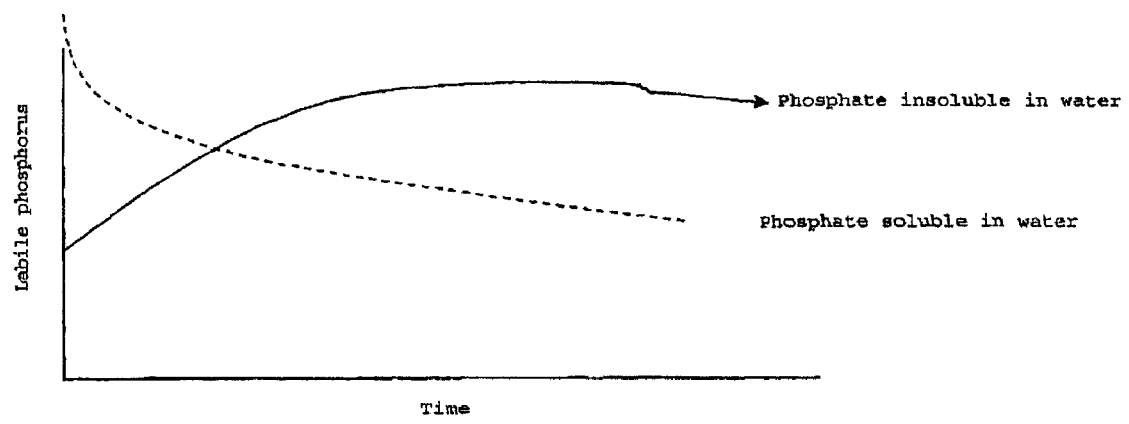
Figure 1: Distribution over time in labile phosphorus in the soil with soluble and "insoluble" sources.

PROCESS FOR OBTAINING A FERTILIZER WITH SUSTAINED RELEASE OF PHOSPHORUS

FIELD OF THE INVENTION

The present invention relates to a process for obtaining solid fertilizers rich in Ca, Mg, Si, S and P and micronutrients, for agricultural use, by a combination of a process of pyrolysis of a pyrobituminous shale (oil shale) with carbonate rocks of marine sedimentary origin (calcareous shale) and phosphate rocks of low solubility (apatites).

BASIS OF THE INVENTION

The dependence of Brazilian agriculture on fertilizers represents a risk to the sustainability of the systems of agricultural production. For this reason, new pathways to resources, and new resources, need to be developed.

The demand of society for agroecological-based technological formats for production to guarantee a secure supply of food, environmental protection and the quantity and quality of food represents a tendency among consumers worldwide.

On the other hand, the high availability of oil shale and of phosphate rocks of low solubility in Brazil and other important countries such as China, expansion of the area under integrated fruit and grain production, and the area under organic production, new market demands for cleaner products in quantity and quality, and biological valuation of food, could represent a new target or competitiveness and sustainability of Brazilian agriculture.

From the agricultural point of view, there have been at least three limiting factors for increasing the production of food, fibres and bioconsumables:
- limits to expansion of new frontiers in agriculture, especially in the countries of the Northern hemisphere (temperate region);
- degradation in soil quality, as a product of a model of agriculture based on intensive movement of the soil, intense use of synthetic and/or soluble chemicals, and monoculture; and
- limited available of the nutrients essential to vegetative growth, and especially phosphorus (P), due to high costs and finite world reserves.

Phosphorus is present in the basic genetic structures (DNA and RNA) and is involved in the production, transfer and storage of energy (via ATP and NADPH), in all natural biological processes. In plants, P is needed for photosynthesis, respiration, cell function, gene transfer and reproduction.

The phosphorus sources usually used in conventional agriculture are: TSP (triple superphosphate), SSP (simple superphosphate), MAP (monoammonium phosphate) and DAP (diammonium phosphate), which are soluble sources and which are not sources which can be used for agroecological or organic production. Less soluble sources are alternatives which can be used for agroecological production. However, they require pretreatment, usually by physical processes such as heating in order to increase the content of soluble phosphorus, as in the case of thermophosphates.

Latosols and argisols account for at least 60% of Brazilian agricultural soils. These soils are old and highly weathered, with a predominance of iron and aluminum oxides and kaolinite, minerals which contribute very little to the natural fertility of the soil (cation exchange capacity—CEC).

Iron and aluminum oxides are minerals with a high specific surface area and high surface reactivity, because they bear functional groups Fe—OH and/or Al—OH which bear a residual charge which varies depending on the pH of the medium. For example, the point of zero charge (PZC) of the oxides of Fe and Al is about pH 8.5, i.e., at the pH commonly observed in Brazilian soils (pH<6). There is a predominance of positive residual charges in the mineral structure, which can be neutralized by phosphate type anions ($PO_4$), which are preferentially absorbed by plants in the ionic form. The chemical bonds between functional groups on the surface of the iron and aluminum oxides and phosphate ions are very stable, which explains the high capacity for fixation, or temporary immobilization, of phosphorus by the soils, which decreases the efficiency of phosphate fertilizer by decreasing the availability of phosphorus in solution in the soil.

For soluble sources of phosphorus, concentrated application along the line of planting decreases the surface of phosphorus which can react with the surface of the clay minerals, decreases phosphorus fixation, and consequently increases agronomic efficiency. However, soluble sources are not compatible with use in agroecological production. In these systems, especially when "crop organs"[i] are removed, nutrient recycling is not always sufficient to sustain productivity and soil quality. Other sources of phosphorus, such as bone flour, thermophosphates and natural phosphates, can be used as alternatives to soluble sources.

Considering the dynamics of phosphorus in the soil, the scarcity of sources worldwide, the increased demand for non-soluble sources for use in agroecological production, the low reactivity and solubility of Brazilian phosphate minerals, the low soil phosphorus levels and the deficiency and response of plants to micronutrients in some regions of Brazil, such as the Cerrado, the development of new processes and materials as sources of phosphorus and of macro and micronutrients is fundamental to expansion of the area under agroecological production, to preservation of the quality of the environment and to sustainable production.

Phosphate fertilizers can be classified basically into phosphate fertilizers obtained industrially (conventional sources of phosphorus—soluble sources), and those intended for "natural application" (natural phosphates).

Industrial fertilizers are represented mainly by the superphosphates (simple and triple), ammonium phosphates (monoammonium phosphate and diammonium phosphate), thermophosphates and biosuper, while natural phosphates include phosphates of sedimentary origin —"soft" phosphates, and phosphates of igneous origin —"hard" phosphates.

Soluble phosphates are obtained by processing natural phosphates (apatites). In this process, simple superphosphate is obtained from stoichiometric mixing of $H_2SO_4$ with natural phosphates. Triple superphosphate is obtained by mixing natural phosphate with phosphoric acid, giving a higher concentration of phosphorus and lower concentration of sulphur. Partial neutralization of phosphoric acid gives monoammonium phosphate (MAP) and diammonium phosphate (DAP).

In addition to these sources, there are other, more soluble sources on the market, which differ from the above in that they are not subjected to attack by sulphuric and phosphoric acid (thermophosphates and biosuper). Thermophosphates are obtained by fusing apatitic or phosphoritic rocks with a magnesium rock (Serpentine) and rapid cooling. Biosuper is obtained by replacing sulphuric acid, used for producing simple superphosphate, with elemental sulphur and bacteria of genus *Thiobacillus*, which oxidize the sulphur to sulphate, producing acidity responsible for acidification of the phosphatidic rock.

Natural phosphates can be of igneous or metamorphic origin (with very low reactivity), with a compact crystal structure and small specific surface area, making fine grinding necessary. The other group of phosphates are of sedimentary origin, which gives them greater reactivity, thanks to the presence of a poorly consolidated microcrystalline structure with a large specific surface area.

The composition of apatites of igneous origin does not include carbonate ($CO_3^{2-}$). Apatite of sedimentary origin, on the other hand, shows substitution of $PO_4^{3-}$ by $CO_3^{2-}$. In general, an increased content of carbonate in apatite results in phosphate rock with greater reactivity. For example, while the $CO_3/PO_4$ mol ratio in the natural phosphate of North Carolina, USA, is 0.26 (reactive material), in phosphate from Patos de Minas, MG, Brazil, (sedimentary origin but with poor reactivity) it is ten times lower.

The most abundant Brazilian phosphates are mainly of igneous origin (Jacupiranga, Araxá, Tapira, Catalão and Anitópolis), and therefore of low reactivity. Consequently, in most cases release of phosphorus for plants after applying these phosphates to the soil is slow.

However, in specific situations (gradual increase in available P in the soil), the low short-term efficiency of these sources can be compensated by their low cost.

Another possibility for using Brazilian phosphates of low reactivity is to submit them to heat treatment in order to increase the solubility thereof, which would enable greater utilization of Brazilian strata with a lower concentration of phosphorus. A prominent example is the production of magnesium thermophosphate by heat-treating Araxá apatite and magnesium rock at a temperature of 1500° C., with rapid cooling in order to prevent recrystallization.

It has been reported to be possible to enrich steel slag with natural phosphates, to give an alkaline phosphate fertilizer similar to thermophosphates, or even for correcting acidity, which contains an appreciable content of phosphorus. In his study, the author concluded that fusion of natural phosphates with steel slag is technically viable and the molten mixture of low reactive phosphate (Araxá) with steel slag in the ratio 4:6 can be considered a phosphate fertilizer, and also has the capacity to correct soil acidity. However, existing processes for enriching industrial by-products with sources of P employ processes involving burning (calcining) at high temperatures, which volatilizes many elements of agricultural interest and promotes mineralization of nutrients, which can easily be removed from the environment by transport processes and can harm the environment. Use of the process of pyrolysis, at 450° C., of pyrobituminous shale rich in volatile organic compounds and macro and micronutrients, enriched with natural phosphate rocks of low solubility, and with a dolomite marl (calcareous shale), represents a possible novel process for obtaining solid fertilizers. These fertilizers are enriched in nutrients which are important for the growth of plants, and they can be used in new niches of the agroecological market; they can also be obtained at low cost by making use of pre-existent industrial processes and installations.

The solubility of the phosphate fertilizer is the principal characteristic used in deciding on which phosphorus source to apply as fertilizer. The agronomic efficiency of phosphate fertilizers is related to the proportion of $P_2O_5$ soluble in water, neutral ammonium citrate or citric acid, in total $P_2O_5$, with the source being considered to be soluble when this proportion is greater than 70% (Malavolta, 1989). In biological terms, there is a close relationship between solubility in citric acid and the biological response in crops. This could account for the fact that plants to which thermophosphate and soluble phosphate fertilizers are applied show similar productivity. Table 1, at the end of the report, shows the concentrations of total $P_2O_5$ and soluble $P_2O_5$ (as a percentage of total $P_2O_5$), in water, citric acid and neutral ammonium citrate, of processed phosphorus sources and natural phosphates, the total contents and contents soluble in citric acid of industrially produced and natural sources of phosphorus.

The selection of a fertilizer as a source of phosphorus is directly related to the availability of the nutrient in the soil and its equilibrium relationships. There are three forms of in the soil which are decisive for these equilibrium relationships: phosphorus in solution; labile phosphorus; and non-labile phosphorus. When the concentrations of phosphorus are not sufficient to maintain levels in the soil which allow the growth of the plants being cultivated, it is necessary to implement strategies for applying fertilizer which overcome the deficiency of phosphorus in solution and maintain a constant supply to the plants. However, application of phosphate fertilizers containing satisfactory quantities of the element does not automatically guarantee an adequate supply of the nutrient to the plants. This is due principally to the following factors:

a) the source used is highly soluble (as in the case of soluble phosphates), and is liable to be "drained or fixed" by the soil, decreasing the capacity to supply plants;

b) release can be very slow (as in the case of natural phosphates), and cannot maintain the levels of the nutrient in solution at adequate concentrations for the plants (phosphorus in fertilizer form).

With the resulting increase in the labile ("available") phosphorus fraction in the soil, the quantity of phosphorus in solution will tend to increase. Nevertheless, if the rate of extraction of phosphorus from the solution is greater than the rate of supply of the element by the labile fraction, the ideal concentration in solution for plant growth will be threatened in the short, medium or long term. Thus, the simple application of fertilizers containing phosphorus may not solve the problem of deficiency of the nutrient, resulting in increased expenditure on the material without increasing crop productivity thereby.

Thus, it is evident that depending on the initial concentration of labile phosphorus in the soil the application of soluble sources can solve the problem of supplying plants. On the other hand, the nutrient is subject to fixation and ("soil-drain") as long as it is in solution in the soil.

In sources of phosphorus "insoluble" in water, the labile fraction tends to increase with time, which contributes to decreasing immobilization and fixation compared with soluble sources. However, supply of quantities of phosphorus for the good development of plants could be threatened. Given this, fertilizer application strategies should optimize application of phosphate fertilizer so as to synchronize the nutritional demands of the crop with the release of nutrients by the sources used.

Soluble phosphates and natural phosphates differ, among other factors, in the conditions of acidity required for solubility and in the acidity generated in the process of release of phosphorus-fertilizer. Low pH favours the solubilization of natural phosphates, while values close to neutrality favour the solubilization of soluble sources. As regards the generation of acidity, the soluble sources tend to acidify the region around the granules, while natural phosphates tend to raise the pH around the fertilizer particles due to their alkaline reaction: i.e. due to consumption of protons during the solubilization process. However, the optimum level of acidity for a source could result in adverse soil conditions as regards the availability of other nutrients and adversely affect microbial activity, with direct negative consequences for plant growth.

Industrial by-products, especially those rich in nutrient and non-nutrient elements have potential for improving the quality and biological productivity of the soil when used in a safe manner—after analysing risks to environmental and food safety; however, they can also represent a source of environmental degradation when badly managed, or if their final destination is not appropriate.

The chemical composition of untreated oil shale, of calcareous shale and of retorted oil shale, shown in Table 2 at the end of the report, presuppose a potential agricultural use for these and/or by-products as starting materials for formulating solid fertilizers rich in Ca, Mg, Cu, Zn, Mn, S and Si, etc. However, these materials have low contents of the nutrient elements (N, K and P), which presupposes the identification of novel production/formulation process which will add these nutrient elements to the final product without adversely affecting the quality of the fertilizer, especially as regards the possibility of using it in agroecological agricultural systems.

STATE OF THE ART

Processes for obtaining solid fertilizers enriched by using starting materials and/or industrial by-products are available in the literature. For example, Brazilian Patent PI 9902803-4 A discloses a process for preparing fertilizer with sustained release of potassium and nitrogen, using as starting materials mining residues of oil shale, such as untreated oil shale and calcareous shale, which are added to a potassium salt, digested and calcined at a temperature between 500 and 1000° C., to produce a fertilizer with sustained release of potassium, indicated for sandy soils.

U.S. Pat. No. 3,595,638 describes a process for converting petroleum coke into a fertilizer. According to the process, petroleum coke is converted into a fertilizer containing up to 12.3% nitrogen, by ammoxidation of the coke, followed by treatment with nitric acid and then neutralization with ammonium hydroxide.

The Petrosix® process, described in Brazilian Patents PI 7105857-5 and PI 8706596-7, granted to Petróleo Brasileiro S.A., relates to extraction of hydrocarbons by pyrolysis of pyrobituminous shale, a sedimentary rock of marine origin in the Irati Formation, dated at 250 million years. The industrial plant is situated in the Brazilian state of Paraná, in the municipality of Sao Mateus do Sul. The Irati formation, a dolomite marl rich in calcium and magnesium oxide separates two layers of shale, of different thicknesses. The Petrosix® process can process 8500 tons/day of pyrobituminous shale, which can contain between 8 and 14% of organic compounds. The low content of organic matter detracts from the integrality of the mined calcareous shale and it is returned to the pits in the mining area. The chemical composition of retorted oil shale, the principal by-product of the Petrosix® process, and calcareous shale, makes them important highly available and low-cost starting materials for formulating fertilizer with sustained release of phosphorus, enriched with macro and micronutrients.

One object of the present invention is to make use of these characteristics of the by-products of the industrial processing of oil shale, in order to produce new products, in this specific case phosphate fertilizers with sustained release of phosphorus, meeting market requirements.

Thus, the present invention presents a process for obtaining a solid fertilizer with sustained release of phosphorus, enriched with Ca, Mg, S, Si and micronutrients, by a combination of pyrolysis of a pyrobituminous shale at a temperature of 450-500° C., with the addition of calcareous shale and of a phosphatidic rock, which represents a promising innovation compared to the prior art, and will certainly serve to fill a gap in the availability of fertilizers permitted for use in agroecological systems, taking advantage of an existing structure for industrial processing associated with oil extraction.

Given the characteristics of sources of phosphorus fertilizers and chemical, physical and biological characteristics of the by-products from oil shale processing, these by-products could become important conditioners of soil quality and efficiency of phosphate fertilizer application, and contribute to increasing the availability of calcium, magnesium, silicon, sulphur and micronutrients for plants.

These and other advantages will become evident in the course of the detailed description of the present invention.

SUMMARY OF THE INVENTION

The present invention relates to a process for obtaining a fertilizer with sustained release of phosphorus, enriched with other macro and micronutrients, which can be produced by pyrolysis of pyrobituminous shale, in combination with calcareous shale and with natural phosphatidic rocks.

After mining of pyrobituminous shale, calcareous shale and natural phosphatidic rock, the material is transported and separated by particle size, retaining particles with a diameter in the range 6 to 300 mm. The fertilizers formulations are prepared, changing the proportions of each of the starting materials in the mixture to be fed to the retort. The pyrolysed rocks are cooled and ground, adding an agglomeration agent, sulphur and micronutrients to complete the desired formulation. The product is then granulated, dried and stored.

BRIEF DESCRIPTION OF THE DRAWING

FIG. 1 demonstrates that for water-soluble phosphorus sources the content of labile-P tends to be more easily decreased over time. In contrast, with sources of phosphorus which are "insoluble" in water, labile-P tends to increase with time.

DETAILED DESCRIPTION OF THE INVENTION

The present invention represents a strategy for formulating a solid fertilizer with sustained release of phosphorus, enriched with macro and micro nutrients important for biological productivity of crops, which can also be used in areas of agroecological production. By pyrolysis of rocks of sedimentary and metamorphic origin, a formulation is obtained which is enriched in phosphorus, due to pyrolysis of phosphate rocks, added to the retort together with the pyrobituminous shale. The process of the present invention thus uses the retort process for oil shale already functioning at Petrobrás, at the Unit for Marketing and Processing of Oil Shale, conferring agricultural value (as fertilizer) to the retorted oil shale, by adding phosphatidic rock to the starting material used in the process. This gives fertilizers based on oil shale enriched with natural phosphorus-rich rocks, which, together with the chemical products present in the oil shale, and the sulphur compounds, offer greater bioavailability of phosphorus for plants, with improved rates of absorption.

Basically the process comprises the following steps:
 open-cast mining of pyrobituminous shale, calcareous shale and natural phosphatidic rock;
 transportation of the starting materials in a dump truck to the crushing unit, and retention of particle sizes in the range of from 6 to 300 mm in diameter;
 cold preparation of mixtures of pyrobituminous shale, calcareous shale and phosphatidic rock, in different proportions, between 0 and 100% by mass of the components of the feedstock, to obtain solid fertilizers of different compositions;

transportation of the mixture, by means of a conveyor belt, and discharge in the upper part of the retorting unit, maintaining a downward flow rate of approximately 64 tons/hour, injecting an inert gas, obtained from the pyrolysis process itself, perpendicular to the downward flow of the rocks, at a temperature of 450 to 500° C.;

cooling of the mass of pyrolysed rock to 130-150° C., by passing the retorted rocks through a hydraulic seal constituted by the structural water of the rocks, which is vaporized during the pyrolysis process, cooled externally and recycled to the retort seal;

grinding of the resulting material after pyrolysis and cooling, adding to the same an agglomerating agent, water, sulphur and micronutrients, to give the desired formulations;

passing the ground material to a mixer, followed by a granulator, where the selected granules are transported by conveyor belt to the drying unit to give consistency to the fertilizer granules;

temporary storage of the fertilizer granules in suitable silos, followed by later bagging or sale in bulk.

The great advantage of the present invention is that it represents a strategy for formulating a solid fertilizer with sustained release of phosphorus, enriched with macro and micro nutrients important for biological productivity of crops, which can also be used in areas of agroecological production, by pyrolysis of rocks of sedimentary and metamorphic origin, to give a formulation enriched in phosphorus due to the pyrolysis of phosphate rocks added to the process together with the pyrobituminous shale.

Another advantage is that the process of the present invention makes use of the existing processing structure already functioning at Petrobrás, with the principal objective of conferring, agricultural value (as fertilizer) to the retorted oil shale, by adding phosphatidic rock to the starting material used in the process, so as to obtain a fertilizer based on oil shale enriched with natural rocks rich in phosphorus, which in a natural oxidizing environment due to the chemical compounds present in the oil shale, such as the sulphur compounds, presents greater bioavailability of phosphorus for plants compared with the use of these natural phosphatidic rocks on their own.

Table 3 at the end of the report shows the percentage distribution by mass of the starting materials employed to obtain solid fertilizers of different compositions. Formulations were prepared which contained 0, 16.5, 25, 33.33, 50, 66.66 and 100%, of each component of the starting material, respectively, loaded into the retort.

TABLE 1

Concentrations of total $P_2O_5$ and soluble $P_2O_5$ (as a percentage of total $P_2O_5$), in water, citric acid and neutral ammonium citrate, of processed phosphorus sources and natural phosphates.

| Source | Total $P_2O_5$ | Percentage of total $P_2O_5$ soluble in: | | |
| --- | --- | --- | --- | --- |
| | | Water % | Citrate % | Citric acid % |
| Processed Sources | | | | |
| Simple Superphosphate | 20 | 85 | 90 | 90 |
| Triple Superphosphate | 46 | 85 | 96 | 96 |
| Monoammonium Phosphate (MAP) | 50 | 94 | 100 | 100 |

TABLE 1-continued

Concentrations of total $P_2O_5$ and soluble $P_2O_5$ (as a percentage of total $P_2O_5$), in water, citric acid and neutral ammonium citrate, of processed phosphorus sources and natural phosphates.

| Source | Total $P_2O_5$ | Percentage of total $P_2O_5$ soluble in: | | |
| --- | --- | --- | --- | --- |
| | | Water % | Citrate % | Citric acid % |
| Diammonium Phosphate (DAP) | 44 | 91 | 100 | 100 |
| Thermophosphate | 19 | 0 | 68 | 84 |
| Natural phosphates Phosphorites[1] | | | | |
| Hyperphosphate (Gafsa), Tunisia | 30 | 0 | 23 | 43 |
| Phosphate North Carolina, USA[1] | 30 | | | 17 |
| Phosphate Florida, USA[1] | 33.7 | 0 | 0 | 8 |
| Arad Phosphate, Israel[1] | 33 | | 18 | 32 |
| Olinda, Brazil Apatites | 18 | 0 | 17 | 33 |
| Alvorada (Brazil) | 33 | 0 | 6 | 18 |
| Araxá (Brazil) | 30 | 0 | 10 | 20 |
| Catalão (Brazil) | 37 | 0 | 1 | 7 |
| Pato de Minas (Brazil) | 23 | 0 | 4 | 17 |
| Tapira (Brazil) | 37 | 0 | 5 | 7 |
| Jacupiranga (Brazil) | 33 | | | 6 |

[1]The term phosphorite is frequently used for natural phosphates of sedimentary origin and, therefore, with greater reactivity.

TABLE 2

Chemical composition of untreated oil shale, calcareous shale and retorted oil shale without tyre recycling in the process of pyrolysis.

| Parameter | untreated oil shale | calcareous shale | retorted oil shale |
| --- | --- | --- | --- |
| Li, mg/kg | 25.80 | 13.47 | 11.79 |
| Ba, mg/kg | 228.14 | 130.44 | 406.83 |
| B, mg/kg | 7.53 | <0.05 | 4.66 |
| Na, % | 0.41 | 0.17 | 0.30 |
| Mg, % | 0.68 | 6.73 | 1.03 |
| Al, % | 4.32 | 2.71 | 5.37 |
| Si, % | 23.81 | 15.68 | 28.46 |
| P, mg/kg | 308.60 | 407.06 | 649.96 |
| K, % | 0.42 | 0.23 | 0.48 |
| Ca, % | 0.44 | 10.88 | 2.29 |
| Ti, mg/kg | 0.23 | 0.12 | 0.26 |
| V, mg/kg | 102.45 | 212.14 | 104.77 |
| Cr, mg/kg | 11.73 | 2.61 | 9.37 |
| Mn, mg/kg | 58.34 | 1014.24 | 304.45 |
| Fe, % | 7.22 | 3.14 | 4.80 |
| Co, mg/kg | 22.59 | 8.80 | 16.75 |
| Ni, mg/kg | 3.82 | <0.003 | 5.73 |
| Cu, mg/kg | 51.20 | 26.09 | 73.06 |
| Zn, mg/kg | 75.34 | 17.78 | 89.35 |
| As, mg/kg | <0.03 | <0.03 | <0.03 |
| Se, mg/kg | <0.02 | <0.02 | <0.02 |
| Mo, mg/kg | <0.03 | <0.03 | <0.03 |
| Ag, mg/kg | 158.55 | 25.53 | 69.06 |
| Sn, mg/kg | 457.87 | 297.99 | 224.01 |
| Te, mg/kg | <0.02 | <0.02 | <0.02 |

TABLE 3

Percentage distribution by mass of the starting materials employed to obtain solid fertilizers of different compositions.

| Starting material | untreated oil shale (%) | calcareous shale (%) | phosphatidic rock (%) |
|---|---|---|---|
| E1 | 100 | 0 | 0 |
| E2 | 0 | 100 | 0 |
| E3 | 0 | 0 | 100 |
| E4 | 75 | 25 | 0 |
| E5 | 50 | 50 | 0 |
| E6 | 25 | 75 | 0 |
| E7 | 75 | 0 | 25 |
| E8 | 50 | 0 | 50 |
| E9 | 25 | 0 | 75 |
| E10 | 33.33 | 33.33 | 33.33 |
| E11 | 66.66 | 16.5 | 16.5 |
| E12 | 16.5 | 66.66 | 16.5 |
| E13 | 16.5 | 16.5 | 66.66 |

The invention claimed is:

1. A process for obtaining fertilizer with sustained release of phosphorus comprising the steps of:
   providing a pyrobituminous shale in combination with carbonate rocks of marine sedimentary origin and phosphate rocks of low solubility, and
   conducting pyrolysis, at temperatures between 450° C. to 500° C. with injection of an inert gas, of the pyrobituminous shale in combination with the carbonate rocks of marine sedimentary origin and the phosphate rocks of low solubility, to obtain fertilizer.

2. The process for obtaining fertilizer with sustained release of phosphorous according to claim 1, wherein the carbonate rock is calcareous shale.

3. The process for obtaining fertilizer with sustained release of phosphorus according to claim 1, wherein the phosphatidic rock is apatite.

4. The process for obtaining fertilizer with sustained release of phosphorus according to claim 1, wherein said process comprises the steps of:

open-cast mining of pyrobituminous shale, calcareous shale and natural phosphatidic rock;

transportation of the starting materials in a dump truck to the crushing unit, and retention of particle sizes in the range of 6 to 300 mm in diameter;

cold preparation of mixtures of pyrobituminous shale, calcareous shale and phosphatidic rock, in different proportions, between 0 and 100% by mass of the components of the feedstock, to obtain solid fertilizers of different compositions;

transportation of the mixture, by means of a conveyor belt, and discharge in an upper part of a retorting unit, maintaining a downward flow rate of approximately 64 tons/hour, injecting an inert gas, obtained from the pyrolysis process itself, perpendicular to the downward flow of the rocks, at a temperature of 450° C. to 500° C.;

cooling of the mass of pyrolysed rock to 130° C.-150° C., by passing the retorted rocks through a hydraulic seal constituted by the structural water of the rocks, which is vaporized during the pyrolysis process, cooled externally and recycled to the retort seal;

grinding of the resulting material after pyrolysis and cooling, adding to the same an agglomerating agent, water, sulphur and micronutrients; and passing the ground material to a mixer, followed by a granulator, where the granules are transported by conveyor belt to a drying unit to give consistency to the fertilizer granules.

5. The process for obtaining fertilizer with sustained release of phosphorus according to claim 4, wherein the process allows preparation of formulations containing proportions varying from 0 to 100% of each starting material component loaded into the retort.

6. The process for obtaining fertilizer with sustained release of phosphorus according to claim 1, wherein the process permits formulation of a solid fertilizer with sustained release of phosphorus, enriched with macro and micro nutrients.

* * * * *